3,361,707
YELLOW, ULTRAVIOLET LIGHT STABILIZED, 1-OLEFIN RESIN COMPOSITION
Gordon C. Newland, Kingsport, Tenn., assignor to Eastman Kodak Company, Rochester, N.Y., a corporation of New Jersey
No Drawing. Filed Jan. 18, 1965, Ser. No. 426,355
7 Claims. (Cl. 260—41)

ABSTRACT OF THE DISCLOSURE

A stabilized normally solid thermoplastic composition consisting essentially of normally solid 1-olefin resin and N-(p-phenylazophenyl) maleimide at a concentration of about 0.1 to about 10% by weight of said resin.

---

This invention resides in the chemical arts. It pertains to 1-olefin resins and relates to the problem of coloring them to the problem of stabilizing them relative to the degradative effects of ultraviolet light.

In the manufacture of plastic articles it is often desirable to add an attractive color to the plastic composition. In the case of molded articles of thick sections the color is usually the result of a colorant milled into the plastic prior to molding. When the finished articles are fibers or fabric the color is often induced by dyeing. However, in the case of normally solid polymers of 1-olefins, such as normally solid polyethylene and crystalline polypropylene, which are thermoplastic, synthetic resins which have gained a wide-spread use as materials of construction, dyeing is difficult to accomplish and a number of the dyes lack light fastness. Even in the case of articles molded from normally solid polymers of 1-olefins, colors therein often fade on exposure to ultraviolet light. Hence, there is a need for colorants for normally solid polymers of 1-olefins, which give attractive colors and which resist fading on exposure to ultraviolet light.

As is well known, normally solid polymers of 1-olefins undergo photochemical degradation when exposed to ultraviolet light. This effect is frequently termed weathering. It appears to be a photooxidation process which causes rupture of the polymer chains and formation of carbonyl (=C=O) groups. As this degradation progresses, articles manufactured from 1-olefin polymers tend to crack, become brittle and lose tensile strength to the extent of mechanical failure. Hence, there is a problem inhibiting the ultraviolet light deterioration of 1-olefin polymers. One solution to the problem is to add to the plastic composition based on a 1-olefin polymer a compound which inhibits its ultraviolet light degradation. However, many colorants either nullify or substantially reduce the effectiveness of such compounds as ultraviolet light stabilizers in 1-olefin polymers.

This invention is based upon the discovery that N-(p-phenylazophenyl)maleimide, when incorporated into 1-olefin polymers, is an attractive yellow colorant for them, has a high degree of light fastness, has high tinctorial properties, can be incorporated in 1-olefin polymers by conventional compounding procedures and confers on 1-olefin polymers a high degree of stability to embrittlement by action of ultraviolet light.

In summary, this invention comprises a normally solid, yellow, thermoplastic composition consisting essentially of normally solid, 1-olefin resin and N-(p-phenylazophenyl) maleimide at a concentration in a range from about 0.1 to about 10% by weight of said resin.

The normally solid, 1-olefin resin in the normally solid yellow, thermoplastic composition of this invention consists essentially of at least one, normally solid, 1-olefin polymer. Such a polymer, commonly referred to generically as a poly-α-olefin, is one which is derived from a 1-monoolefinic hydrocarbon having 2–20 carbon atoms, generally 2–10 carbon atoms and usually 2–6 carbon atoms. It is also provided by the normally solid copolymers, which include graft polymers, addition polymers, block copolymers and the like, of 1-monoolefinic hydrocarbons having 2–20 carbon atoms, generally 2–10 carbon atoms and usually 2–6 carbon atoms, as well as of these 1-monoolefinic hydrocarbons and other compounds. Examples of a normally solid polymer derived from a 1-monoolefinic hydrocarbon having 2–20 carbon atoms include the linear and branched, low density and high density, crystalline and amorphous, normally solid homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethylene-1-hexene, 6-methyl-1-heptene, 6-ethyl-1-heptene, styrene, allyl benzene, and the like. Processes for preparing a normally solid 1-olefin polymer are well known and described in detail in the prior art. See, for example, the U.S. patent, No. 2,153,553, to Fawcett et al., the U.S. patent, No. 2,912,429, to Cash and the U.S. patent, No. 2,917,500, to Hagemeyer et al. In general, a normally solid, 1-olefin resin is a thermoplastic material which at 20° C. is solid. It includes the so-called poly-α-olefin waxes which usually have average molecular weights in a range from about 3000 to about 12,000.

The normally solid, 1-olefin resin of the 1-olefin composition of this invention, in addition to at least one normally solid, 1-olefin resin, can also comprise other polymeric components. Thus, it can comprise a normally solid resin derived from another 1-moncolefinic hydrocarbon having 2–20 carbon atoms. It can comprise at a minor concentration a different kind of polymer, generally present as a physical property improver.

N-(p-phenylazophenyl)maleimide, also known as p-phenylazomaleimanil, is a known compound. A reference which describes its synthesis is J. Chem. Soc. (1955), 2970. While under the concepts of this invention this additive is employed at a concentration in a range from about 0.1 to about 10% by weight of the resin, the preferred range when ultraviolet light stability is the primary objective is from about 0.5 to about 3% by weight, the preferred range when color is the primary objective is about 0.1 to about 5% by weight, and the preferred range when color and ultraviolet light stability stand about equal in objective, is about 0.5 to about 5% by weight of the 1-olefin resin.

The normally solid, 1-olefin resin composition of this invention is made by incorporating the N-(p-phenylazophenyl)maleimide of this invention into the normally solid 1-olefin resin. Generally, such incorporation is performed by any one of a number of known methods, such as, for example, roll compounding, extrusion, solvent mixing and the like. For instance, such incorporation can be performed by heating or otherwise softening the normally solid resin to a workable consistency and then working in, as by roll compounding, the additive of this invention until a substantially uniform blend or dispersion is obtained. Generally, such incorporation takes place at the same time that other additives are normally incorporated into the 1-olefin resin and usually along with such other additives as the formulation of the particular plastic composition requires.

The normally solid, yellow, thermoplastic composition of this invention is useful in coatings and as a material of construction for shaped articles. Thus, the composition can be made into various shaped articles such as, for example, pellets, sheeting, films, bars, tubes, filaments, fibers, specially shaped structural elements and the like as by conventional casting and molding techniques which include extrusion, blow molding and the like.

This invention is further illustrated by the following examples of various aspects thereof, including preferred specific embodiments of the invention. This invention is not limited to these specific embodiments unless otherwise indicated.

Example 1

This example illustrates a specific embodiment of a yellow polyethylene composition of this invention.

The formulation of this embodiment is:

| Components: | Parts by weight |
| --- | --- |
| Normally solid polyethylene | 100 |
| N-(p-phenylazophenyl)maleimide | 1 |

This specific embodiment is made by hot roll compounding the components for 5 minutes with the front roll being at 270° F. and the rear roll being at 220° F. The specific composition thus obtained is a yellow, ultraviolet light stabilized material which can be shaped as by compression molding into useful articles.

Example 2

This example illustrates a specific embodiment of a yellow polypropylene composition of this invention.

The formulation of this composition is:

| Components: | Parts by weight |
| --- | --- |
| Normally solid polypropylene | 100 |
| N-(p-phenylazophenyl)maleimide | 1 |

This specific embodiment is made by admixing the components in an inert atmosphere in a C. W. Brabender Plastograph. There is thus obtained a yellow, ultraviolet light stabilized, polypropylene composition which can be shaped as by injection molding and the like into useful articles.

Example 3

This example illustrates a specific embodiment of a yellow, poly(1-butene) composition of this invention.

The formulation of this specific embodiment is:

| Components: | Parts by weight |
| --- | --- |
| Normally solid poly(1-butene) | 100 |
| N-(p-phenylazophenyl)maleimide | 1 |

This specific embodiment is made by admixing the components in an inert atmosphere in a C. W. Brabender Plastograph. The product thus obtained is a yellow, ultraviolet light stabilized, poly(1-butene) composition which can be formed as by injection molding into useful articles.

Samples of these specific embodiments have been tested for ultraviolet light stability.

In the first series of tests the samples were made from a normally solid polyethylene having a density of 0.918. The formulation of each sample is indicated in the following table. The samples were made by the procedure described in connection with the formulation of Example 1. Each sample thus obtained was compression molded into plates 0.125 and 0.060 inch thick.

The 0.060 inch thick plates were placed outdoors at Kingsport, Tenn. Periodically, infrared measurements were made on the 0.060 inch plates to determine the increase in carbonyl content. The exposure time required to produce an increase of 10 units of carbonyl content was thereby determined for each sample.

The 0.125 inch thick plate of each sample was cut into ten specimens 0.5 inch x 1.5 inches and the specimens were bent into U-shape and while thus stressed inserted upside down in an aluminum channel 0.5 inch wide. While thus mounted under stress, the specimens of each sample were exposed to natural weathering outdoors at Kingsport, Tenn. Periodically, the specimens were inspected for the development of stress cracks visible to the unaided eye. When stress cracks had developed in half of the exposed specimens of a sample the exposure time required to reach this condition was determined. This exposure time was considered to be the stress crack free life of the sample. Also observed for each sample was the color change of the plate during this exposure.

The results of this testing are summarized in the following table.

| Sample No. | Additives | Concentration in parts by wt. | Stress Crack Free Life (Mo.) | Days Exposure Required for Increase of 10 Units of Carbonyl Content | Color Change During Exposure |
| --- | --- | --- | --- | --- | --- |
| 1 | None | | 12 | 60 | None. |
| 2 | N-(p-phenylazophenyl)maleimide | 1 | 51 | 360 | Do. |
| 3 | Lead chromate | 5 | 12 | Opaque to infrared | Slight darkening. |
| 4 | Sun Yellow (a commercial pigment) | 5 | 12 | do | Slight fading. |

Sample No. 2 corresponds to the specific embodiment of Example 1.

These data show that the polyethylene composition of this invention, sample 2, was light fast. Moreover, these data show that N-(p-phenylazophenyl)maleimide protected the polyethylene from stress cracking for four years and from the development of appreciable carbonyl content for approximately one year.

In another series of tests the samples were made from crystalline polypropylene having an inherent viscosity of 1.4. The samples were made according to the procedure set forth in connection with Example 2. The components of each sample consisted essentially of the crystalline polypropylene and the additives indicated in the following table. The samples as made were granulated and then injection molded into tensile bars 1/16 inch thick and 2½ inches long. Three tensile bar specimens of each sample were bent into a U and inserted upside down while thus bent into a channel 5/8 inch wide. The tensile bar specimens thus mounted were then placed into a modified Atlas Twin-Arc Weather-Ometer [Anal. Chem. 25, 460 (1953)]. Periodically, the specimens were inspected for the development of stress cracks visible under 3× magnification. When all three specimens of a sample had developed 3× visible stress cracks, the stress crack free life of the sample was then determined, it being the averaged exposure in hours required to develop cracks in all three specimens. The specimens were also inspected for changes in color. The results of these tests are summarized in the following table.

| Sample No. | Additives | Concentration in Parts by Wt. | Stress Crack Free Life (Hrs.) | Color Change During Exposure |
|---|---|---|---|---|
| 1 | None | | 90 | Slight yellowing. |
| 2 | N-(p-phenylazophenyl)maleimide | 1 | 1,310 | None. |
| 3 | Lead chromate | 5 | 140 | Slight darkening. |
| 4 | Titanium IV oxide | 1.5 | 90 | Slight yellowing. |
| 5 | Polyester Yellow 5GLS | 1 | 330 | None. |

Sample No. 2 corresponds to the specific embodiment of Example 2.

The data show that the polypropylene composition of this invention has good color retention and outstanding weathering stability.

In another series of tests the samples where made from a normally solid poly(1-butene) having an inherent viscosity of 1.5. The samples were made according to the procedure of Example 3. The samples consisted essentially of the normally solid poly(1-butene) and the additives indicated in the following table. In each case the sample was granulated and injection molded into three tensile bars 1/16 inch thick and 2½ inches long. The tensile bar specimens were bent into a U and while thus under stress inserted upside down in a ⅝ inch wide channel. While thus mounted the tensile bar specimens were placed into the modified Atlas Twin-Arc Weather-Ometer. Periodically the specimens were inspected for the development of stress cracks visible under 3× magnification. The stress crack free life in hours, the averaged exposure time required to develop stress cracks in all three specimens, was thereby determined. The specimens were also inspected for color change. The test results are summarized in the following table.

| Sample No. | Additives | Concentration in Parts by Wt. | Stress Crack Free Life (Hrs.) | Color Change During Exposure |
|---|---|---|---|---|
| 1 | None | | 135 | Yellowed. |
| 2 | N-(p-phenylazophenyl)maleimide | 1 | 1,950 | None. |
| 3 | Lead chromate | 5 | 260 | Darkened. |
| 4 | Polyester Yellow 5GLS | 1 | 390 | None. |

Sample No. 2 corresponds to the specific embodiment of Example 3.

These data show that N-(p-phenylazophenyl)maleimide in poly(1-butene) is light fast and confers on the 1-olefin resin an exceptional stability to weathering.

Thus, this invention provides an ultraviolet light stabilized, attractive, light fast yellow, normally solid, 1-olefin resin composition.

These and other features, advantages and specific embodiments will be readily apparent to those in the exercise of ordinary skill in the art after reading the foregoing disclosures. In this connection while specific embodiments of this invention have been described in considerable detail, variations and modifications can be effected without departing from the spirit and scope of the invention as described and claimed.

I claim:
1. A normally solid, thermoplastic composition consisting essentially of normally solid 1-olefin resin and N-(p-phenylazophenyl)maleimide at a concentration in a range from about 0.1 to about 10% by weight of said 1-olefin resin.

2. A composition according to claim 1 wherein said concentration is in a range from about 0.5 to about 5% by weight of said 1-olefin resin.

3. An ultraviolet light stabilized, yellow, thermoplastic composition consisting essentially of normally solid polyethylene and N-(p-phenylazophenyl)maleimide at a concentration in a range from about 0.5 to about 5% by weight of said polyethylene.

4. An ultraviolet light stabilized, yellow, thermoplastic composition consisting essentially of normally solid polypropylene and N-(p-phenylazophenyl)maleimide at a concentration in a range from about 0.5 to about 5% by weight of said polypropylene.

5. An ultraviolet light stabilized, yellow, thermoplastic composition consisting essentially of normally solid poly(1-butene) and N-(p-phenylazophenyl(maleimide at a concentration in a range from about 0.5 to about 5% by weight of said poly(1-butene).

6. Shaped articles of a normally solid, thermoplastic composition consisting essentially of normally solid 1-olefin resin and N-(p-phenylazophenyl)maleimide at a concentration in a range from about 0.1 to about 10% by weight of said 1-olefin resin.

7. The invention according to claim 6 wherein the shaped articles are selected from the class consisting of pellets, sheeting, films, bars, tubes and filaments.

References Cited

UNITED STATES PATENTS 3,105,059  9/1963  Van der Burg _____ 260—45.8

DONALD E. CZAJA, *Primary Examiner.*

L. J. BERCOVITZ, *Examiner.*

M. J. WELSH, *Assistant Examiner.*